United States Patent [19]

Cohen

[11] Patent Number: 5,719,692
[45] Date of Patent: Feb. 17, 1998

[54] RULE INDUCTION ON LARGE NOISY DATA SETS

[75] Inventor: William W. Cohen, North Plainfield, N.J.

[73] Assignee: Lucent Technologies Inc., Murray Hill, N.J.

[21] Appl. No.: 499,247

[22] Filed: Jul. 7, 1995

[51] Int. Cl.$^6$ .............................. G06F 17/00; G06F 15/00
[52] U.S. Cl. ..................... 395/23; 395/20; 395/21; 395/22; 395/23; 395/50; 395/77
[58] Field of Search ............................... 395/10, 21, 22, 395/23, 50, 54, 20, 77

[56] References Cited

U.S. PATENT DOCUMENTS

| | | | |
|---|---|---|---|
| 5,222,197 | 6/1993 | Teng et al. | 395/68 |
| 5,265,192 | 11/1993 | McCormack | 395/22 |
| 5,373,486 | 12/1994 | Dowla et al. | 367/165 |
| 5,444,796 | 8/1995 | Ornstein et al. | 382/157 |
| 5,481,650 | 1/1996 | Cohen | 395/77 |
| 5,504,840 | 4/1996 | Hiji et al. | 395/77 |
| 5,588,091 | 12/1996 | Alkon et al. | 395/24 |
| 5,590,218 | 12/1996 | Ornstein | 382/157 |

OTHER PUBLICATIONS

J. Furnkraz et al., Incremental Reduced Error Pruning, *Proc. of the Eleventh International Conf.*, Jul. 10, 1994–Oct. 13, 1994, New Brunswick, NJ, USA, pp. 70–77.

J. R. Quinlan et al., "Induction of Logic Programs: Foil and Related Systems," *New Generation Computing*, vol. 13, No. 3-4, 1995, pp. 287-312.

J. Furnkranz, "A Tight Integration of Pruning and Learning," *Machine Learning: ECML-95*, Apr. 25-27, 1994, pp. 291-294.

J. R. Quinlan, "MDL and Categorical Theories," *Machine Learning: Proceedings of the 12th International Conference on Machine Lerning*, Jul. 9-12, 1995, Tahoe City, CA, USA, pp. 464-470.

J. Furnkranz, "FOSSIL: A Robust Relational Learner," *Machine Learning: ECML-94*, Apr. 6-8, 1994, Catania, IT, pp. 122-137.

J. R. Quinlan et al., "FOIL: A Midterm Report," *Machine Learning: ECML-93*, Apr. 5-7, 1993, vienna, AT, pp. 3-20.

P. Clark, R. Boswell, "Rule Induction with CN2 Some Recent Improvements", *Machine Learning —Proceedings of the Fifth European Conf. (EWSL-91)*, pp 151-163, Springer-Verlag (1991).

(List continued on next page.)

*Primary Examiner*—Thomas G. Black
*Assistant Examiner*—Jean R. Homere
*Attorney, Agent, or Firm*—Gordon E. Nelson; Donald P. Dinella

[57] ABSTRACT

Efficient techniques for inducing rules used in classifying data items on a noisy data set. The prior-art IREP technique, which produces a set of classification rules by inducing each rule and then pruning it and continuing thus until a stopping condition is reached, is improved with a new rule-value metric for stopping pruning and with a stopping condition which depends on the description length of the rule set. The rule set which results from the improved IREP technique is then optimized by pruning rules from the set to minimize the description length and further optimized by making a replacement rule and a modified rule for each rule and using the description length to determine whether to use the replacement rule, the modified rule, or the original rule in the rule set. Further improvement is achieved by inducing rules for data items not covered by the original set and then pruning these rules. Still further improvement is gained by repeating the steps of inducing rules for data items not covered, pruning the rules, optimizing the rules, and again pruning for a fixed number of times. The fully-developed technique has the $O(n\log^2 n)$ running time characteristic of IREP, but produces rule sets which do a substantially better job of classification than those produced by IREP.

18 Claims, 9 Drawing Sheets

OTHER PUBLICATIONS

W. W. Cohen, "Efficient Pruning Methods for Separate-and-Conquer Rule Learning Systems", *Machine Learning, Proceedins of the 13th International Joint conf. on Artificial Intelligence*, pp. 988–994, 1993.

J. R. Quinlan, "{Cr.t}: Programs for Machine Learning", Chapter 5, From Trees to Rules, publisher: Morgan Kaufmann, pp. 43–53, 1994.

J. Furnkranz, G. Widmer, "Incremental Reduced Error Pruning", *Machine Learning: Proceedings of the Eleventh Annual Conf.*, Publisher: Morgan Kaufmann, 1994.

FIG. 7

```
ripper(data)
// data is a set of examples;
// returns a ruleset
{
        /* this is IREP* */
        hyp = empty_rule_set;
703─ hyp = add_rules(data,hyp);        } 403
705─ hyp = reduce_dlen(hyp,data);
        /* this is RIPPER, being iterated k times */
        for i=1, . . . , k {   /707                        } 601    701
                hyp = optimize_rules(data,hyp);
                hyp = add_rules(data,hyp);                } 704
                hyp = reduce_dlen(hyp,data);
        }
        return hyp;
}

/* optimize the ruleset hyp, and possibly add some more rules
 * a special case is when hyp is empty---then this builds a ruleset
 */
optimize_rules(data,hyp)
// data is a set of examples;
// hyp is the ruleset that computed the last time around        709
{
        /* optimize existing rules */
        for rule_num = 1, . . . , (number of rules in hyp) {
                /* split the data into growing and pruning sets */
                partition(data,grow_data,prune_data);

/* save the old rule */
                old_rule = hyp[rule_num]; ─710

/* build a new rule */
                new_rule = new rule with empty body asserting class to be "+";
                new_rule = refine(new_rule,grow_data);                        } 713
                new_rule = simplify(new_rule,hyp,rule_num,prune_data);

/* build a revised rule */
                revised_rule = hyp[rule_num];
                revised_rule = refine(revised_rule,grow_data);                } 715
                revised_rule = simplify(revised_rule,hyp,rule_num,prune_data);

712 {           /* pick one of the old, new or revised rules */
                new_val = relative_compression(new_rule,hyp,rule_num,data);
                rev_val = relative_compression(revised_rule,hyp,rule_num,data);
                old_val = relative_compression(old_rule,hyp,rule_num,data);
                if (old_val >= new_val and old_val >= rev_val }
                        chosen_rule = old_rule;                               } 717
                { else if (rev_val >= new_val) {
                        chosen_rule = revised_rule;
                { else }
                        chosen_rule = new_rule;
                }
                remove examples covered by chosen_rule from data; ─721
                hyp[rule_num] = chosen_rule;
        }
}
```

FIG. 8

```
add_rules(data,hyp)
// data is a set of examples;
// hyp is a ruleset;
{
        remove examples covered by any rules in hyp from data;    ~803

/* add new rules for uncovered examples */
        while ((there are positive examples in data)                       801
              and last_rule_accepted)
        {
                /* split the data into growing and pruning sets */
                partition(data,grow_data,prune_data);   ~805

/* build a new rule */
                new_rule = new rule with empty body asserting class to be "+";
     807~   new_rule = refine(new_rule,grow_data);                              806
     809~   new_rule = simplify(new_rule,hyp,rule_num,prune_data);

/* decide if you should keep the new rule */
                if (reject_rule(new_rule,data))  {
     811~           last_rule_accepted = FALSE;
                } else {
                        remove examples covered by new_rule from data;~813
                        append the new_rule to hyp;  ~815
                *}
        }
        return hyp;
}
```

(804 brace groups the while block; 806 brace groups the build-a-new-rule block)

FIG. 9

```
/* decide if a new rule should be added to the ruleset */
reject_rule(rule,data,hyp,rule_num)
{
        if (total compression of hyp with rule and posn rulenum >=    ⎫
            best compression seen to date + MAX_DECOMPRESSION)        ⎬ 911    901
        {                                                             ⎭
                return TRUE;
        }
        else if (error rate of rule on data > 50%) {                  ⎫
                return TRUE;                                          ⎬ 913
        }                                                             ⎭
        else {
                return FALSE;
        }
}

/* grow the rule */
refine(rule,data)
{
        last_refinement_rejected = FALSE;
     ⎡  while (negative examples in data are covered by rule) {
     ⎢      refinement = refinement ref of rule with max ref_value(rule,ref,data);
     ⎢      if (reject_refinement(refinement,rule,data)) {
     ⎢              last_refinement_reject = TRUE;
904 ⎨      } else {
     ⎢              rule = refinement;                                       903
     ⎢              remove from data examples not covered by refine;
     ⎢      }
     ⎣  }
        return rule;
}

/* value function used in refining a rule */
ref_value(old_rule,refined_rule,data)
{
        p1 = number of positive examples in data covered by old_rule;        905
        n1 = number of negative examples in data covered by old_rule;
        p2 = number of positive examples in data covered by refined_rule;
        n2 = number of negative examples in data covered by refined_rule;
        /* return 'information gain' */
        return  p2*[log2((p1+n1)/p1) - log2((p2+n2)/p2)] ~ 907
}

/* generalize a rule */
simplify(rule,hyp,rule_num,data)
{
     ⎡  while (body of rule is not empty) {
     ⎢      gen = generalization of rule with best gen_value(rule,hyp,rule_num,data);
     ⎢      if (value of gen <= value of rule) {
     ⎢              break;
910 ⎨      } else {
     ⎢              rule = gen;                                              909
     ⎢      }
     ⎣  }
        return rule;
}
```

FIG. 10

```
/* value function used in generalization */
gen_value(rule,hyp,rule_num,data)                                      1001
{
        if (rule_num < #rules in hyp) {
                /* optimizing a rule---use accuracy of rule in context */
                hyp1 = copy of hyp;
                hyp1[rule_num] = rule;
                e = number_of_errors made by hyp1 on data;
                tot = number of examples in data;
                return 1 - e/tot;
        } else {
                /* use heuristic function from paper */
                p = number of positive examples in data covered by rule;  ⎫
                n = number of negative examples in data covered by rule;  ⎬ 1005
                return (p_n)/(p+n);  ~1007                                ⎭
        }
}

/* reduction in description length obtained by inserting rule
   in hyp at position rule_num, relative to deleting that rule
   from the hypothesis
*/
relative_compression(rule,hyp,rule_num,data)                           1009
{
        null_rule = new rule with body "false" asserting class to be "+"  ⎫
        hyp_with = copy of hyp;                                           ⎬ 1011
        hyp_with[rule_num] = rule;                                        
        hyp_with = reduce_dlen(hyp_with,data);                            ⎭ hyp_without = copy of hyp;                                        ⎫
        hyp_with[rule_num] = null_rule;                                   ⎬ 1013
        hyp_without = reduce_dlen(hyp_without,data);                      ⎭ dlen_with = data_dlen(hyp_with,data);                             ⎫
        dlen_without = data_dlen(hyp_without,data);                       ⎬ 1015 return    dlen_without - dlen_with+rule_dlen(rule);
}        /
        1017
```

FIG. 11

```
/* description length of data given a hypothesis---ie number of bits
 * needed to encode the exceptions to the predictions made by nyp */
data_dlen(hyp,data)
{
        apply rules in hyp to data and compute these statistics:
            fp = #false positives;
            fn = #false negatives;
            cov = #examples covered;
            uncov = #examples not covered;                              1101

/* return #bits to encode the exceptions (fp,fn)
            using the method of (Quinlan,ML95)
         */
        define subset_dlen(n,e,p) = -Log2(p)*e  +  -Log2(1-p)*(n-e)

e = fn+fp;
        if (cov >= uncov) {
                return
                    Log2(cov+uncov+1)
                       +subset_dlen(cov,fp,0.5*e/cov)
                       +subset_dlen(uncov,fn,fn/uncov);
        } else {
                return
                    Log2(cov+uncov+1)
                       +subset_dlen(uncov,fn,0.5*e/uncov)
                       +subset_dlen(cov,fp,fn/uncov);
        }
}

/* reduce description length of hypothesis by deleting bad rules */
reduce_dlen(hyp,data)
{
        n = #rules in hyp;                                              1109
        for i=n, . . . ,1 do
                hyp1 = copy of hyp with rule i deleted;
1111    1113— if (total_dlen(hyp1,data) < total_dlen(hyp,data)) {
                        hyp = hyp1;
                }
        endfor
        return hyp;
}

/* total description length of hypothesis and data */
total_dlen(hyp,data)
{
        n = #rules in hyp;                                              1115

1117— tot = data_dlen(hyp,data);
        for i=n, . . . ,1 do tot += rule_dlen(hyp[i]);  —1119
        return tot;
}
```

RULE INDUCTION ON LARGE NOISY DATA SETS

BACKGROUND OF THE INVENTION

1. Field of the Invention

The invention relates generally to machine learning techniques and more particularly to techniques for inducing classification rules which will efficiently classify large, noisy sets of data.

2. Description of the Prior Art

Machine Classification: FIG. 1

One of the most common human activities is classification. Given a set of objects, we classify the objects into subsets according to attributes of the objects. For example, if the objects are bills, we may classify them according to the attribute of payment date, with overdue bills making up one subset, due bills another, and not yet due bills the third.

Classification has always been expensive, and has accordingly always been mechanized to the extent permitted by technology. When the digital computer was developed, it was immediately applied to the task of classification. FIG. 1 shows a prior-art classification system 101 which has been implemented using a digital processor 105 and a memory system 103 for storing digital data. Memory 103 contains unclassified data 107 and classifier 111.

Unclassified data 107 is a set of data items 108. Each data item 108 includes attribute values 118(0..n) for a number of attributes 117(0..n). In the bill example, the attributes 117(i) of data items 108 representing bills would include the bill's due date and its past due date and the attribute values 118(i) for a given data item 108 would include the due date and the past due date for the bill represented by that data item. Classifier 111 includes a classifier program 115. Operation of system 101 is as follows: processor 105 executes classifier program 115, which reads each data item 108 from unclassified data 107 into processor 105, classifies the data item 108, and places it in classified data 109 according to its class 110. In the bill example, there would be three classes 110, not yet due, due, and overdue.

While it is possible to build a classifier program 105 in which the classification logic is built into the program, it is common practice to separate classification logic 113 from the program, so that all that is necessary to use the program to classify different kinds of items is to change classification logic 113. One common kind of classification logic 113 is a set of rules 119. Each rule consists of a sequence of logical expressions 121 and a class specifier 123. Each logical expression 121 has an attribute 125 of the data items being classified, a logical operator such as =, <, >, ≦, or ≧, and a value 131 with which the value of attribute 125 is to be compared. Continuing with the bill example, classifier logic 113 for the bills would be made up of three rules:

past_due_date<curr_date→overdue
due_date=<curr_date AND
past_due_date>=curr_date→due
due_date>curr_date→not yet due The expression to the right of the → symbol is the class to which the rule assigns a data item; the expression to the left is the sequence of logical expressions. To classify a data item, classifier program 115 applies rules 119 to the data item until one is found for which all of the logical expressions are true. The class specified for that rule is the class of the data item. Thus, if the due date for a bill is June 1, the past due date June 15, and the current date June 8, executing program 115 with the above set of rules will result in the application of the second rule above to the data item for the bill, and that will in turn classify the bill as being "due".

Inducing Classifier Logic 113: FIG. 2

Building classifier logic 113 for something as simple as the bill classification system is easily done by hand; however, as classification systems grow in complexity, it becomes necessary to automate the construction of classifier logic 113. The art has consequently developed systems for inducing a set of rules from a set of data items which have been labeled with their classifications.

FIG. 2 shows such a system 201, again implemented in a processor and memory. System 201 includes classified data 201 and induction program 205. Classified data 201 is simply a set of data items 108 in which each data item 108 has been classified. As shown at 203, each classified data item 203 includes values for a number of attributes and a class specifier 123 for the class to which the data item belongs. Classifier logic 113 is produced by executing induction program 205 on classified data 201.

There are two techniques known in the art for inducing classifier logic 113. In the first technique, induction program 205 begins by building classifier logic 113 that at first contains much more logic than is optimum for correctly classifying the data items and then prunes classifier logic 113 to reduce its size. In the second technique, classifier logic 113 is built piece by piece, with construction stopping when classifier logic 113 has reached the right size.

The first technique, in which classifier logic 113 is first made much larger than necessary and then pruned, is exemplified by the C4.5 system, described in J. Ross Quinlan, C4.5: *Programs for Machine Learning*, Morgan Kaufman, San Mateo, Calif., 1993. In this system, induction program 205 produces a decision tree from classified data 201 which correctly classifies the data and then prunes the decision tree. One version of C4.5, called C4.5RULES, converts the unpruned decision tree to a set of rules by traversing the decision tree from the root to each leaf in turn. The result of each traversal to a leaf is a rule. The set of rules is then pruned to produce a smaller set which will also correctly classify the data.

The drawback of this technique is that it does not work well with example sets that are large and noisy. In the machine learning context, a noisy data set is one which does not permit generation of a set of rules in which a classification produced by a given rule is exactly correct but rather only permits generation of a set of rules in which the classification produced by a given rule is probably correct. As the size and/or the noisiness of the example data set increase, the technique becomes expensive in terms of both computation time and memory space. With regard to time, the technique's time requirements asymptotically approach $O(n^4)$, where n is the number of classified data items 203 in classified data 201. With regard to space, the technique requires that the entire decision tree be constructed in memory and in the case of the rule version, that there be storage space for all of the rules produced from the decision tree. Some improvement of the foregoing is possible with problems where there are only two classes of data items, but even the improved technique requires $O(n^3)$ time and $O(n^2)$ space.

The second technique is much less expensive in terms of time and space. This technique, called Incremental Reduced Error Pruning, or IREP, is explained in detail in Johannes F ürnkranz and Gerhard Widmer, "Incremental reduced error pruning", in: *Machine Learning: Proceedings of the Eleventh Annual Conference*, Morgan Kaufmann, New Brunswick, N.J., 1994. IREP builds up classifier logic 113 as a set of rules, one rule at a time. After a rule is found, all examples covered by the rule (both positive and negative)

are deleted from classified data 201. This process is repeated until there are no positive examples, or until the last rule found by IREP has an unacceptably large error rate.

In order to build a rule, IREP uses the following strategy. First, the examples from classified data 201 which are not covered by any rule are randomly partitioned into two subsets, a growing set and a pruning set.

Next, a rule is "grown" using a technique such as FOIL, described in detail in J. R. Quinlan and R. M. Cameron-Jones, "FOIL: a Midterm Report", in: Pavel B. Brazdil, ed., *Machine Learning: ECML*-1993, (*Lecture Notes in Computer Science* #667), Springer-Verlag, Vienna, Austria, 1993. FOIL begins with an empty conjunction of conditions, and considers adding to this any condition of the form $A_n = v$, $A_c \leq \theta$, or $A_c \geq \theta$, where $A_n$ is a nominal attribute and $v$ is a legal value for $A_n$, or $A_c$ is a continuous variable and $\theta$ is some value for $A_c$ that occurs in the training data. A condition is selected to be added when adding the condition maximizes FOIL's information gain criterion. Conditions are added until the rule covers no negative examples from the growing dataset.

Once grown, the rule is immediately pruned. Pruning is implemented by deleting a single final condition of the rule and choosing the deletion that maximizes the function $$v(\text{Rule, PrunePos, PruneNeg}) \equiv \frac{p + (N - n)}{P + N} \quad (1)$$

where P (respectively N) is the total number of examples in PrunePos (PruneNeg) and p (n) is the number of examples in PrunePos (PruneNeg) covered by Rule. This process is repeated until no deletion improves the value of $v$. Rules thus grown and pruned are added to the rule set until the accuracy of the last rule added is less than the accuracy of the empty rule.

IREP does indeed overcome the time and space problems posed by the first technique. IREP has a running time of $O(n\log^2 n)$ and because it grows its rule set, also has far smaller space requirements than the first technique. Experiments with IREP and C4.5RULES suggest that it would take about 79 CPU years for C4.5RULES to produce a rule set from an example data set having 500,000 data items, while IREP can produce a rule set from that data set in 7 CPU minutes. IREP is thus fast enough to be used in many interactive applications, while C4.5RULES is not. There are however two problems with IREP. The first is that rule sets made using the first technique make substantially fewer classification errors than those made using IREP. The second is that IREP fails to converge on some data sets, that is, exposing IREP to more classified examples from these data sets does not reduce the error rate of the rules.

It is an object of the invention to provide a technique for inducing a set of rules which has time and space requirements on the order of those for IREP, but which converges and produces sets of rules which classify as well as those produced by the first technique.

SUMMARY OF THE INVENTION

The foregoing and other problems of the art are solved by making a rule set which is substantially smaller than the largest rule set that can be made by the method being used and then producing a final rule set by optimizing the original rule set with regard to the rule set as a whole. Making a small rule set gives the time and space advantages of the IREP approach, while optimization with regard to the rule set as a whole substantially improves the quality of the classification produced by the rule set.

A particularly advantageous way of optimizing with regard to the rule set as a whole is to optimize so as to reduce the description length of the rule set. The invention features two types of such optimization. In one type, rules are pruned from the rule set to reduce the description length. In another type, rules in the rule set are modified to reduce the description length. In a preferred embodiment, the rule set is first pruned and the pruned rule set is then modified.

Additional improvement is achieved by iterating with any example data items which are not covered by the rules in the optimized rule set. New rules are generated for those data items as described above and added to the rule set produced by the first iteration. The new rule set is then optimized. Iteration may continue a fixed number of times or until there are no data items which are not correctly classified by the rule set.

In other aspects of the invention, the set of rules is produced by inducing the rules one by one and pruning each rule as it is produced. Production of rules continues until a stopping condition is satisfied. The invention further provides better techniques for pruning individual rules and a better rule value metric for determining when to stop pruning a rule. Also provided is a stopping condition for the rule set which is based on the description length of the rule set with the new rule relative to the smallest description length obtained for any of the rule sets thus far. Finally, IREP has been improved to support missing attributes, numerical variables, and multiple classes.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 7 is pseudo-code for a preferred embodiment of a first portion of the method of FIG. 6;

FIG. 8 is pseudo-code for a preferred embodiment of a second portion of the method of FIG. 6;

FIG. 9 is pseudo-code for a preferred embodiment of a third portion of the method of FIG. 6;

FIG. 10 is pseudo-code for a preferred embodiment of a fourth portion of the method of FIG. 6; and FIG. 11 is pseudo-code for a preferred embodiment of a fifth portion of the method of FIG. 6.

Figure 1:
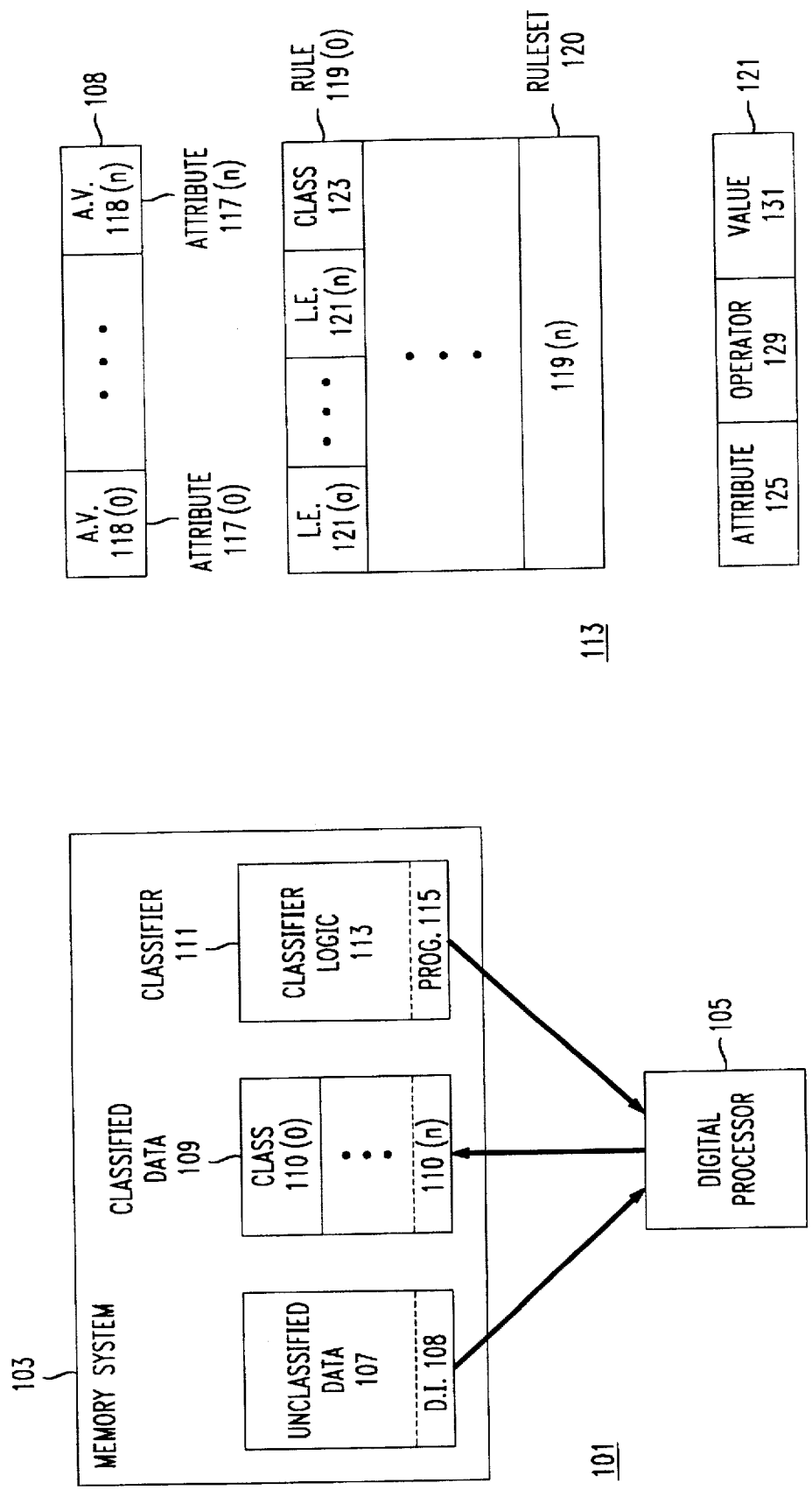
FIG. 1 is a block diagram of a prior-art classifier.
Figure 2:
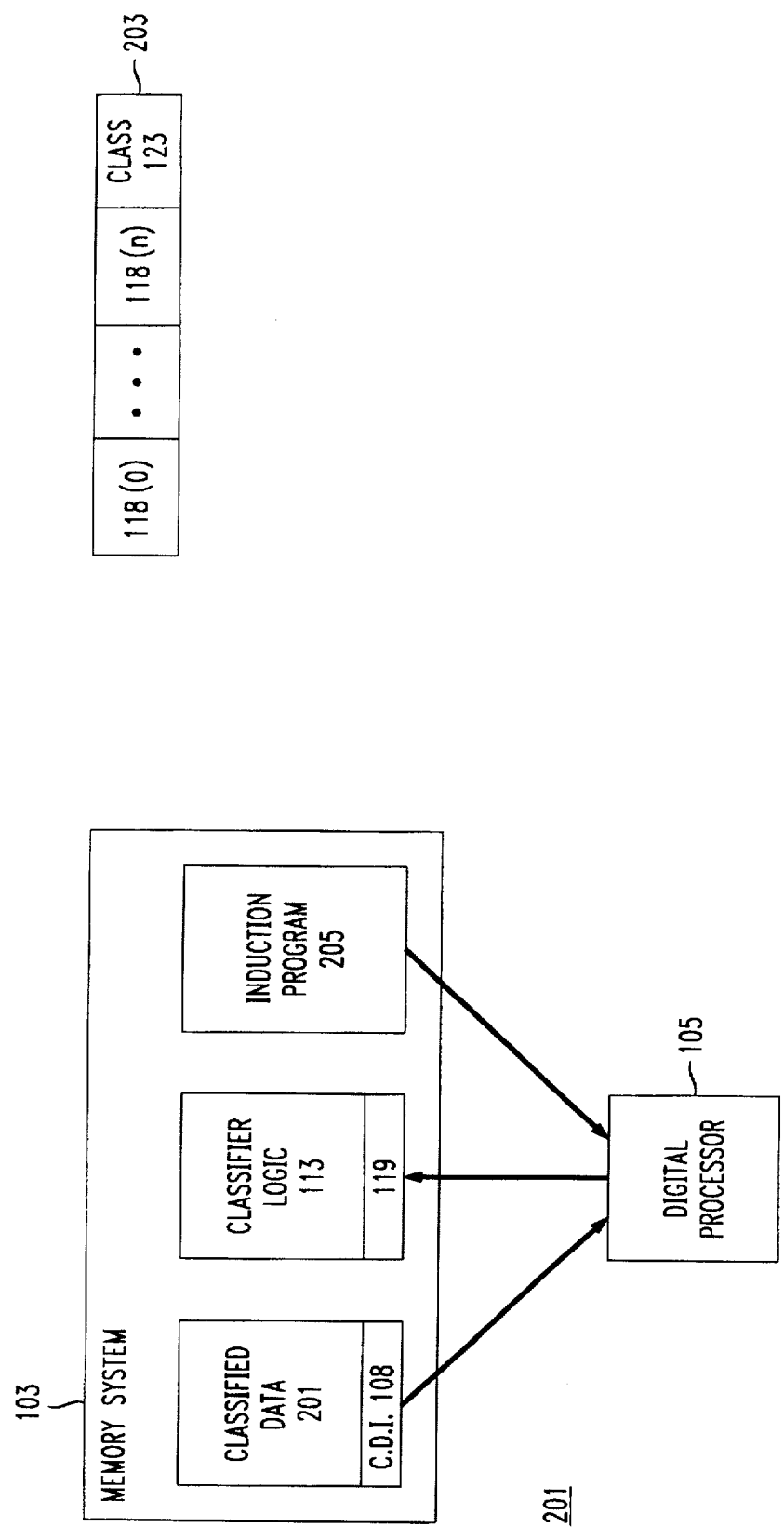
FIG. 2 is a block diagram of a prior-art system for inducing classifier logic.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

In the following, the new technique for inducing a set of rules is described in three stages: first, an improved version of IREP called IREP* is presented; then a technique for optimizing the rule set produced by IREP* is set forth; next, a method which combines IREP* and the optimization is described. This method is termed RIPPER (for Repeated Incremental Pruning to Produce Error Reduction). Finally, an iterative version of RIPPER called RIPPERk is presented. Thereupon, details are provided of the preferred embodiment's implementation of salient portions of IREP* and RIPPER.

IREP*: FIG. 4

Figure 4:
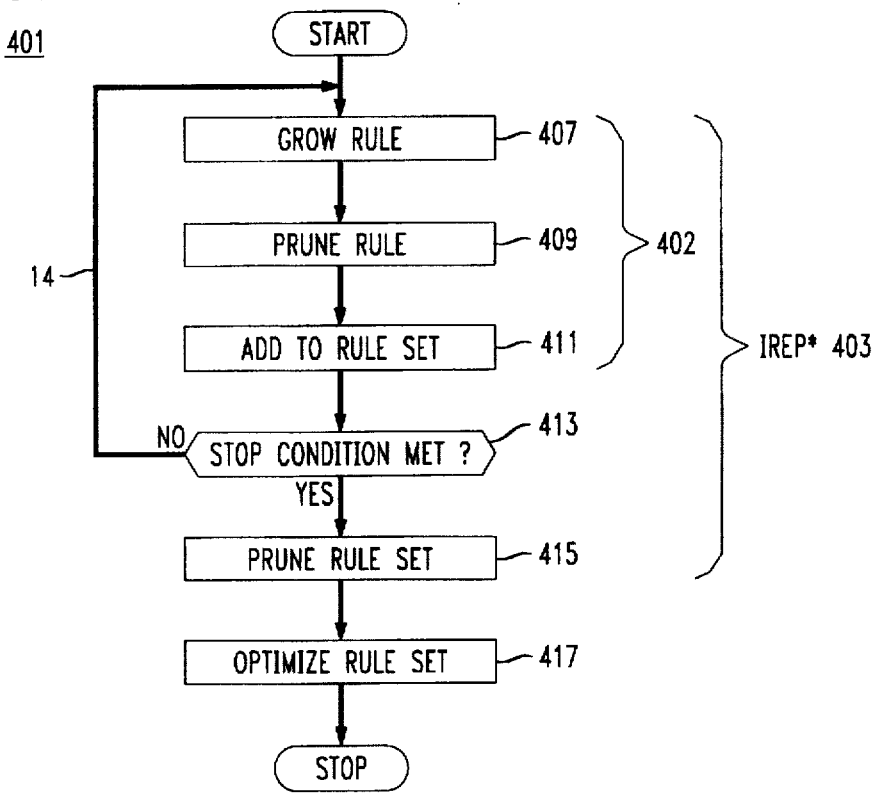
FIG. 4 is a flowchart of a first rule induction method.

A flowchart 401 for IREP* 403 is shown in FIG. 4. The first part of IREP* 403 is loop 414, which builds the set of rules rule-for-rule. At step 407, a rule 119(i) is grown in the fashion described above for IREP. The next step, 409, is to prune rule 119(i). In contrast to IREP, any final sequence of conditions in rule 119(i) is considered for pruning and that sequence is retained which maximizes a rule-value metric function $$v^*(\text{Rule}, \text{PrunePos}, \text{PruneNeg}) \equiv \frac{p-n}{p+n}$$

The above function is for rules that classify the data items into two classes. p represents the number of positive data items, that is, those that the rule successfully classifies as members of the rule's class. n represents the number of negative data items, that is those that the rule successfully classifies as not being members of the rule's class. After rule 119(i) has been grown and pruned, it is added to rule set 120 (411).

Decision block 413 determines whether the stopping condition for rule set 120 has been met. If it has not, loop 414 is repeated. Proper choice of the stopping condition ensures that rule set 120 is large enough to properly classify the data but small enough to avoid the time and space problems of techniques such as those used in the C4.5 system. In the preferred embodiment, the stopping condition is determined as follows using the Minimum Description Length Principle. As set forth at Quinlan, C4.5: *Programs for Machine Learning*, supra, p. 51f., the principle states that the best set of rules derivable from the training data will minimize the number of bits required to encode a message consisting of the set of rules together with the those data items which are not correctly classified by the rules and are therefore exceptions to them. The length of this message for a given set of rules is the description length of the rule set, and the best rule set is the one with the minimum description length.

In IREP* 403, the description length is used like this to determine whether the rule set is large enough: After each rule is added, the description length for the new rule set is computed. IREP* 403 stops adding rules when this description length is more than d bits larger than the smallest description length obtained for any rule set so far, or when there are no more positive examples. In the preferred embodiment, d=64.

In the preferred embodiment, the scheme used to encode the description length of a rule set and its exceptions is described in J. Ross Quinlan, "MDL and categorical theories (continued)", in: *Machine Learning: Proceedings of the Twelfth International Conference*, Lake Tahoe, Calif., 1995, Morgan Kaufmann. One part of this encoding scheme can be used to determine the number of bits needed to send a rule with k conditions. The part of interest allows one to identify a subset of k elements of a known set of n elements using $$S(n, k, p) \equiv k \log_2 \frac{1}{p} + (n-k) \log_2 \frac{1}{1-p}$$

bits, where p is known by the recipient of the message. Thus we allow $\|k\|+S(n,k,k/n)$ bits to send a rule with k conditions, where n is the number of possible conditions that could appear in a rule and $\|k\|$ is the number of bits needed to send the integer k. The estimated number of bits required to send the theory is then multiplied by 0.5 to adjust for possible redundancy in the attributes.

The number of bits needed to send exceptions is determined as follows, where T is the number of exceptions, C is the number of examples covered, U is the number of examples not covered, e is the number of errors, fp is the number of false positive errors, and fn is the number of false negative errors. The number of bits to send exceptions is then if (C>T/2) then $$\log(T+1)+S(C,fp,e/2C)+S(U,fn,fn/U)$$

else $$\log(T+1)+S(U,fn,e/2U)+S(C,fp,fp/C)$$

After the stopping condition has been met, the rule set is pruned in step 415. The pruning is done in a preferred embodiment by examining each rule in turn (starting with the last rule added), computing the description length of the rule set with and without the rule, and deleting any rule whose absence reduces the description length.

Together, the rule-value metric used in pruning step 409 and the stopping metric used in stopping condition 413 of IREP* 403 substantially improve IREP's performance. IREP* 408 converges on data sets upon which IREP fails to converge and the rule sets produced using IREP* 403 do substantially better at making correct classifications than those produced using IREP. In tests on a suite of data sets used for determining the performance of systems for inducing rules, sets of rules produced by IREP* 403 had 6% more classification errors than sets of rules produced by C4.5RULES, while sets of rules produced by IREP had 13% more errors.

IREP* improves on other aspects of IREP as well. As originally implemented, IREP did not support missing attribute values in a data item, attributes with numerical values, or multiple classes. Missing attribute values are handled like this: all tests involving the attribute A are defined to fail on instances for which the value of A is missing. This encourages IREP* to separate out the positive examples using tests that are known to succeed.

IREP* or any method which induces rules that can distinguish two classes can be extended to handle multiple classes in this fashion: First, the classes are ordered. In the preferred embodiment the ordering is always in increasing order of prevalence—i.e., the ordering is $C_1, \ldots, C_k$ where $C_1$ is the least prevalent class and $C_k$ is the most prevalent. Then, the two-class rule induction method is used to find a rule set that separates $C_1$ from the remaining classes; this is done by splitting the example data into a class of positive data which includes only examples labeled $C_1$ and a class of negative data which contains examples of all the other classes and then calling the two-class rule induction method to induce rules for $C_1$. When this is done, all data items classified as belonging to $C_1$ by the those rules are removed from the data set. Next, all instances covered by the learned rule set are removed from the dataset. The above process is repeated with each of the remaining classes $C_2 \ldots, C_k$ until only $C_k$ remains; this class will be used as the default class.

Optimization of the Rule Set: FIG. 4

A problem with IREP is that the effect of a given rule on the quality of the set of rules as a whole is never considered. IREP* 403 begins to deal with this problem with step 415 of pruning the rule set, as described above. A further approach to dealing with this problem is optimization step 417. The aim of the optimization is to modify the rules in the rule set so as to minimize the error of the entire rule set.

In the preferred embodiment, the method used in optimization step 417 is the following: Given a rule set 120 $R_1, \ldots, R_k$, consider each rule in turn: first $R_1$, then $R_2$, etc, in the order in which they were induced. For each rule $R_i$, two alternative rules are constructed. The replacement for $R_i$ is formed by growing and then pruning a rule $R'_i$, where pruning is guided so as to minimize error of the entire rule set $R_1, \ldots, R'_i, \ldots, R_k$ on the pruning data. The revision of $R_i$ is formed analogously, except that the revision is grown by greedily adding conditions to $R_i$, rather than the empty rule. Finally, the decision length technique described above is used to determine whether the final rule set 120 should include the revised rule, the replacement rule, or the original rule. This is done by inserting each of the variants of $R_i$ into the rule set and then deleting rules that increase the description length of the rules and examples. The description length of the examples and the simplified rule set is then used to compare variants of $R_i$ and the variant is chosen which produces the rule set with the shortest description length.

RIPPER: FIG. 15

Figure 5:
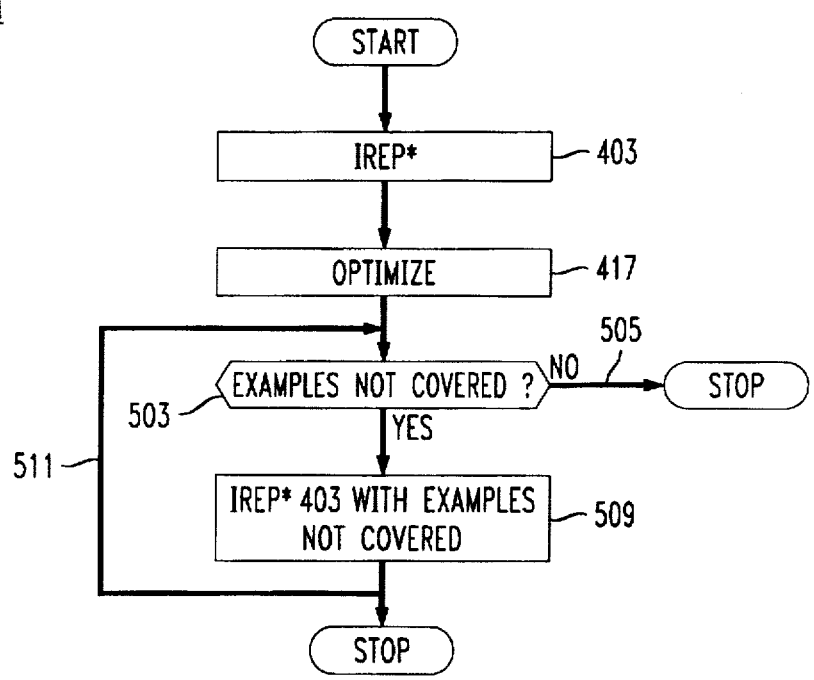
FIG. 5 is a flowchart of a second rule induction method.

IREP* 403 and optimization step 417 are employed in RIPPER method 501 shown in FIG. 5. A first rule set is obtained by using IREP* 403 and optimizing the result (417), as shown in flowchart 401; then as indicated in decision block 503, the rule set is applied to the example data items to see if there are any data items which are not covered by the rule set, i.e., which are not correctly classified by the rule set. If there are, as shown in block 509, loop 511 uses IREP* 403 to add rules to the rule set until all examples are covered. RIPPER 501 further improves over IREP: rule sets produced by RIPPER 501 now make only 1% more classification errors than those produced by C4.5RULES.

Figure 6:
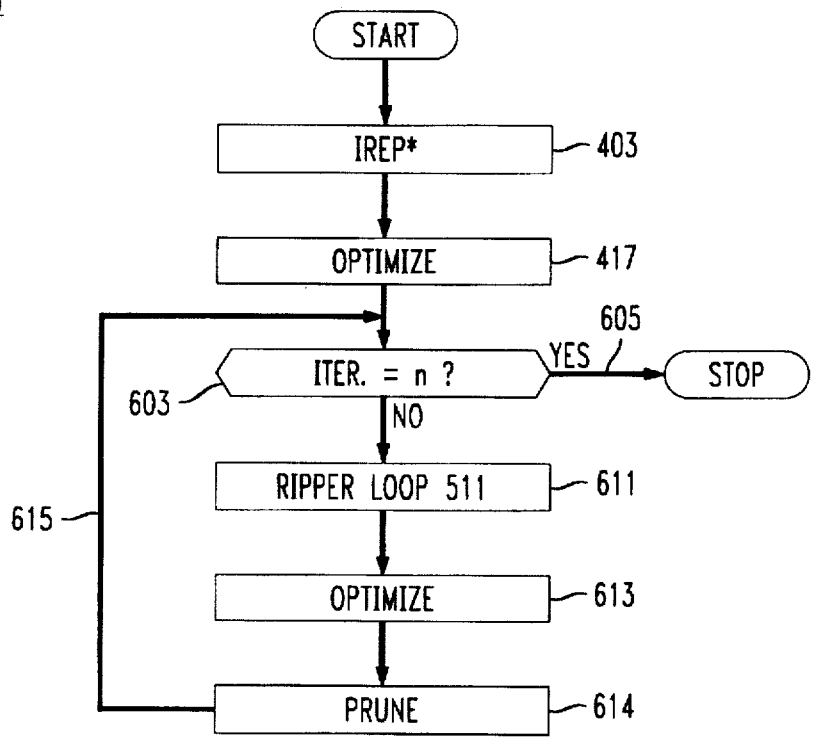
FIG. 6 is a flowchart of a third rule induction method.

RIPPERk: FIG. 6

Further performance improvements can be obtained by placing loop 511 from RIPPER 501 in another loop which iterates finding data items not covered by the rule set, adding rules for those data items to the set of rules to produce an augmented rule set, and then optimizing the augmented rule set using the techniques described above for IREP*. This version of the technique, called RIPPERk, where k is the number of iterations, is shown in FIG. 6.

RIPPERk 601 begins with the steps of flowchart 401 (i.e., IREP* 403 plus optimization 417); it then enters loop 615, which it executes a fixed number of times. On each iteration of loop 615, RIPPER loop 511 is executed to obtain a rule set which covers all of the examples. This rule set is then optimized in step 613 in the fashion described above with regard to optimization step 417 and thereupon pruned as described with regard to pruning step 415. This final version of the technique was run on the trial data sets with k=2. The rule set produced by RIPPER2 was as good at classifying as that produced by C4.5RULES and RIPPER2 retained the $O(n\log^2 n)$ running time characteristic of IREP.

Details of a Preferred Embodiment: FIGS. 3, 7–11

Figure 3:
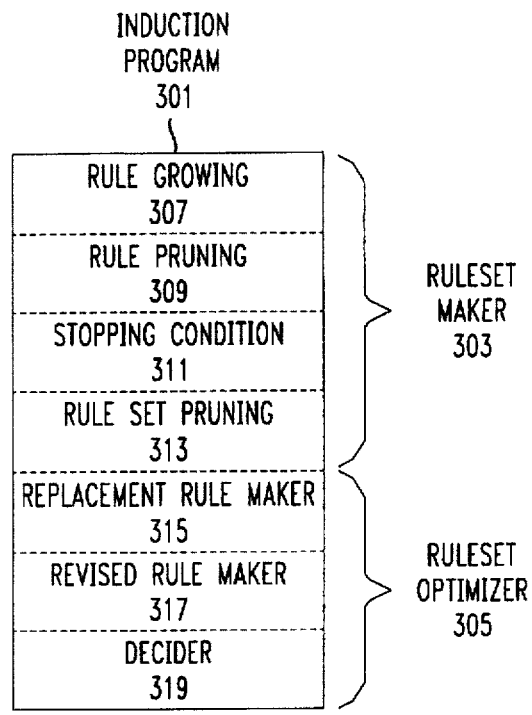
FIG. 3 is a diagram of modules in an induction program.

The foregoing techniques are implemented in a preferred embodiment by means of an improved induction program 301, shown in FIG. 3. Induction program 301 includes two sets of components. Rule set making components 303 makes the rule set; a rule set optimizer 305, optimizes the rule set. Rule set making components 303 include a rule growing component 307, which grows individual rules, a rule pruning component 309, which prunes the rules and includes the rule value metric, a stopping condition component 311, which determines whether further rules should be added to the rule set, and a rule set pruning component 313, which prunes the rule set. Rule set optimizer 305 includes a component 315 for making replacement rules, a component 317 for making revised rules, and a deciding component 319 for deciding whether to use the original rule, the replacement rule, or the revised rule in the rule set.

Pseudo-Code for the Preferred Embodiment

FIGS. 7–11 present pseudo-code for an implementation of the rule set making components 303 and the rule set optimizer 305 together with the control logic required for RIPPERk, in the preferred embodiment. The implementation is a two-class classification system; as described above, such a two-class classification system can be used to implement a multi-class classification system.

ripper 701

Beginning with FIG. 7, ripper 701 is the top level function which implements RIPPERk in the preferred embodiment. It takes a set of classified examples 201 as an argument and returns a set of rules hyp 704. The part of ripper 701 labeled 403 implements IREP*, while the part of it labeled 601 implements RIPPERk. At 703, ripper 701, invokes the function add_rules 703, which implements loop 414 of flowchart 401 and produces a first set of rules for the dataset and classification. Then the function reduce_dlen 705 prunes the first rule set, and thus implements step 415 of flowchart 401.

The pruned rule set is then iteratively optimized k times in loop 704, which thus implements loop 615 of FIG. 6. In loop 704, the function optimize_rules 707 implements process steps 611 and 613, with the function add_rules adding rules for data items not covered by the current rule set, and the function reduce_dlen performs pruning step 614. When loop 704 has run the prescribed number of times, ripper 701 returns the final rule set.

add_rules

Continuing with the functions invoked by ripper 701, add_rules is shown at 801 in FIG. 8. The first step, 803, is removing any examples covered by a rule that is already in the rule set from the example data. Then new rules are added in loop 804 until the stopping condition occurs. To build each rule, the example data is first partitioned into a set of data for growing the rule and a set of data for testing it for pruning purposes (805). Then the new rule is built (806). Construction starts with an "empty rule" that has the class "+" (since this is a two-class classifier) and an empty set of logical expressions 121. In the case of a multiple class system, the empty rule would have the class for which rules were currently being made.

At 807, the refine function adds the logical expressions 121 to the rule. This function is shown at 903 in FIG. 9. Loop 904 adds logical expressions one at a time until there are no negative examples covered by the rule. As each logical expression is added, its information gain is computed as shown at 907 in ref_value function 905. When the stopping condition for adding logical expressions is reached, the rule is returned; otherwise, the logical expression is added to the rule and negative examples no longer covered by the refined rule are removed from the data set and the loop is repeated.

Next, at 209, the simplify function prunes the new rule simplify is shown in more detail at 909. Loop 910 of the function 909 performs different prunings; for each pruning, the function gen_value computes the rule-value metric. If the rule-value metric for the current pruning is better than the best previously achieved, the pruning is retained; otherwise, it is deleted. When a pruning is retained, the negative examples not covered by the pruning are removed from the data set and the loop 910 is repeated. gen_value is shown in detail in FIG. 10 at 1001. The part of gen_value which is of importance for the present discussion is at 1005, where the rule-value metric discussed supra is shown at 1007.

At 811, the function reject_rule is invoked to check the stopping condition. Pseudo-code for the function is at 901. As shown at 901, the preferred embodiment has two stopping conditions. The first stopping condition to be checked (911) uses the description length and indicates that the stopping condition has occurred when the description length which results when the current rule is added to the rule set is larger than the shortest description length yet attained for the rule set by an amount which is greater than or equal to the constant amount MAX_DECOMPRESSION. If this stopping condition has not occurred, the function 901 checks at 913 whether the rule to be added has an error rate of more than 50%; again, if it does, the function indicates that the stopping condition has occurred. When the stopping condition has occurred, the variable last_rule_accepted is set to FALSE, which terminates loop 804. If the stopping condition has not occurred, the examples covered by the new rule are removed from the data (813) and the new rule is added to the rule set (815).

reduce_dlen

The reduce_dlen function (705) prunes the rule set produced by add_rules. The function 705 is shown in detail at 1109 in FIG. 11. The function 1109 consists mostly of loop 1111, which, for each rule in turn, makes a copy of the current rule set without the rule and then computes the description lengths of the current rule set with and without the rule. If the current rule set without the rule has the shorter description length (1113), that rule set becomes the current rule set. The description length is computed by the function total_dlen, shown at 1115. total_dlen first uses the function data_dlen to compute the description length of the data items which are exceptions to the current rule set (1117) and then makes the description length for the entire rule set. As shown at 1119, that is done by starting with the description length of the data items and then adding to it the description length of each rule in turn. As for data_dlen, that function is shown in detail at 1101. The function simply implements the method described in the Quinlan 1995 reference discussed supra.

optimize_rules

This function 709 takes the rule set produced by IREP* 403 and optimizes it by making a new rule for each rule in the rule set, making a modified rule for each rule in the rule set, and then using the description lengths of the rule set with the original rule, with the new rule, and with the modified rule to select one of the three for inclusion in the optimized rule set. The function 709 contains loop 712, which is executed for each rule in the rule set. For each rule, the function saves the old rule (710). It then makes a new rule (713) in the same manner as explained for add_rules; next it makes a modified rule (715) by adding logical expressions to the old rule. Adding and pruning are again done as explained for add_rules. Next, the rule that yields the rule set with the shortest description length is chosen (717). Then the examples covered by the chosen rule are removed from the example data (721).

The function used to compute the description length is relateive_compression, shown in detail in FIG. 10 at 1009. The function 1009 first produces a copy of the rule set with the chosen rule and prunes the rule set using reduce_dlen (1011); then the function 1009 does the same with a copy of the rule set without the chosen rule (1013); then the function 1009 computes the description length of the exceptions for each of the pruned rule sets (1015), and finally the function 1009 returns the difference between the description length for the exceptions for the rule set without the rule and the sum of the description length for the exceptions for the rule set with the rule plus the description length of the rule (1017). The computation of the description lengths is done using data_dlen as already described above.

Conclusion

The foregoing Detailed Description has disclosed to those skilled in the art the best mode presently known to the inventor of practicing his techniques for inducing rule sets for classifiers from example data sets. The techniques disclosed herein produce rule sets which are as accurate as those produced by systems such as C4.5, but the production of the rule sets requires far fewer computational resources. Resources are saved by producing a rule set which has "just enough" rules; accuracy is obtained by the stopping conditions used to terminate rule pruning and rule set growth and by optimization techniques which optimize the rule set with regard to the rule set as a whole. Iteration increases the effectiveness of the optimization techniques. A particular advantage of the techniques disclosed herein is their use of description length to determine the stopping condition and to optimize the rule set.

As will be immediately apparant to those skilled in the art, many embodiments of the techniques other than those disclosed herein are possible. For example, the preferred embodiment uses an improvement of IREP to produce the rule set; however, any other technique may be used which similarly produces "just enough" rules. Further, the preferred embodiment uses description length to optimize with regard to the entire rule set; however, other optimization techniques which optimize with regard to the entire rule set may be used as well. Moreover, optimization techniques other than the pruning and modification techniques disclosed herein may be employed. Finally, those skilled in the art are easily capable of producing implementations of the principles of the invention other than the implementation disclosed in the pseudo-code.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. A method practiced in a computer system which includes a processor and a memory system of inducing sets of classification logic rules for classifying data items from an example dataset of the data items, the sets of classification logic rules and the example dataset being stored in the memory system and the method comprising the steps performed in the processor of:

inducing a first rule set from the example dataset according to a predetermined method, the first rule set being substantially smaller than a largest rule set producible by the predetermined method, and storing the first rule set in the memory system; and optimizing the first rule set with regard to the largest rule set to produce a second rule set.

2. The method set forth in claim 1, further comprising the steps of:

after producing the second rule set, producing a third rule set by adding rules to the second rule set to cover data items from the example dataset not covered by the second rule set; and optimizing the third rule set to produce a new second rule set.

3. The method set forth in claim 2, wherein the method is iterated n times and the second rule set is the new second rule set produced in the nth iteration.

4. The method set forth in any of claims 2 or 3, wherein the step of optimizing the first rule set or the third rule set includes the step of computing a description length for the first rule set or the third rule set and using the description length in the optimization.

5. The method set forth in claim 4, wherein the step of optimizing the first rule set or the third rule set includes the step of pruning the first rule set or the third rule set.

6. The method set forth in claim 5, and further comprising the step of pruning the first rule set or the third rule set as each rule is induced to maximize a function $$\frac{p-n}{p+n}$$

where p is a number of positive examples for the rule in the example dataset and n is a number of negative examples for the rule.

7. The method set forth in claim 6, wherein the step of pruning the first rule set is done by deleting rules from the first rule set such that the description length of the first rule set is reduced.

8. The method set forth in claim 5, wherein the step of pruning the first rule set is done by deleting rules from the first rule set such that the description length of the first rule set is reduced.

9. The method set forth in any of claims 2 or 3, wherein the step of optimizing the first rule set or the step of optimizing the third rule set comprises the steps performed for each rule in the first or the third rule set of:

making a modification of the rule and pruning the modification to minimize an error of the first or the third rule set; and determining from the description length of the first or the third rule set with the rule and with the modification whether to replace the rule with the modification.

10. The method set forth in claim 9, wherein the step of making a modification comprises the steps of:

making a first modification independently of the rule; and making a second modification by adding conditions to the rule; and the step of determining determines whether to replace the rule with the first modification or the second modification.

11. The method set forth in claim 9, wherein the step of optimizing further comprises pruning the first or the third rule set by deleting rules from the first or the third rule set such that the description length of the first or the third rule set is reduced.

12. The method set forth in any of claims 1, 2, or 3, wherein the step of inducing the first rule set is performed by inducing the rules, rule-by-rule, until a predetermined stopping condition occurs.

13. The method set forth in claim 12, wherein the step of inducing the first rule set includes the step of checking a description length of the first rule set to determine whether the stopping condition has occurred.

14. The method set forth in claim 13, wherein the step of checking the description length of the first rule set is performed repeatedly and includes the step of comparing a current value of the description length of the first rule set with a shortest description length thus far obtained to determine whether the stopping condition has occurred.

15. The method set forth in claim 14, wherein the step of comparing the description length determines that the stopping condition has occurred when the current value of the description length of the first rule set is more than a predetermined value larger than the shortest description length.

16. A method practiced in a computer system which includes a processor and a memory system of inducing a set of classification logic rules for classifying data items from an example dataset of the data items, the rules and the example dataset being stored in the memory system and the method comprising the steps performed in the processor for each rule of:

inducing the rule on the example dataset;

adding the rule to the set of classification logic rules;

computing a description length of the set of classification logic rules with the added rule; and terminating the method if the description length satisfies a predetermined condition.

17. The method of claim 16, wherein the predetermined condition is the description length which is a predetermined amount larger than a smallest previously-computed description length.

18. The method of claim 16, further comprising the step performed for each rule of pruning the set of classification logic rules to maximize a function $$\frac{p-n}{p+n}$$

where p is a number of positive examples for the rule in the example dataset and n is a number of negative examples for the rule.

* * * * *